(12) United States Patent
Khill

(10) Patent No.: US 7,154,899 B2
(45) Date of Patent: Dec. 26, 2006

(54) PROTECTING THE FILTERING DATABASE IN VIRTUAL BRIDGES

(75) Inventor: Uzi Khill, Netanya (IL)

(73) Assignee: Corrigent Systems Ltd., Tel Aviv (IL)

( * ) Notice: Subject to any disclaimer, the term of this patent is extended or adjusted under 35 U.S.C. 154(b) by 992 days.

(21) Appl. No.: 10/061,721

(22) Filed: Feb. 1, 2002

(65) Prior Publication Data

US 2003/0147405 A1    Aug. 7, 2003

(51) Int. Cl.
*H04L 12/28* (2006.01)

(52) U.S. Cl. ..................................... 370/401

(58) Field of Classification Search .................. None
See application file for complete search history.

(56) References Cited

U.S. PATENT DOCUMENTS

| | | | |
|---|---|---|---|
| 5,983,360 A * | 11/1999 | Ugajin ........................ | 714/11 |
| 6,032,194 A | 2/2000 | Gai et al. | |
| 6,205,488 B1 | 3/2001 | Casey et al. | |
| 6,304,575 B1 | 10/2001 | Carroll et al. | |
| 6,330,229 B1 * | 12/2001 | Jain et al. ................... | 370/256 |
| 6,339,595 B1 | 1/2002 | Rekhter et al. | |
| 6,446,131 B1 * | 9/2002 | Khansari et al. ............ | 709/238 |
| 6,466,985 B1 | 10/2002 | Goyal et al. | |
| 6,628,624 B1 | 9/2003 | Mahajan et al. | |
| 6,765,921 B1 | 7/2004 | Stacey et al. | |
| 6,879,594 B1 | 4/2005 | Lee et al. | |
| 2001/0022786 A1 * | 9/2001 | King et al. .................. | 370/412 |
| 2004/0202171 A1 | 10/2004 | Hama | |

OTHER PUBLICATIONS

ISO/IEC Standard 7498-1: 1994, "Information processing Systems—Open Systems Interconnection-Basic Reference Model—Part 1: The Basic Model" (available from American National Standards Institute, New York).

Lasserre et al., "Transparent VLAN Services Over MPLS", Jul. 2001. (Available at: search.ietf.org/internet-drafts/draft-lasserre-tls-mpls-00.txt.

Rosen, et al., in Request for Commetns (RFC) 3031 of the Internet Engineering Task Force (IETF), entitled: "Multiprotocol Label Switching Architecture", Jan. 2001. (Available at: www.ietf.org/rfc.html).

"IEEE Standard for Information Technology, Telecommunications and Information Exchange between Systems, Local and Metropolitan Area Network, Common Specifications, Part 3: Media Access Control (MAC) Bridges", Published as ANSI/IEEE Standard 802.1D (1998). Available at: standards.ieee.org/catalog/IEEE802.1.html.

"IEEE Standard for Local and Metropolitan Area Network: Virtual Bridged Local Area Networks", Published as IEEE Standard 802.1Q ('1998). Available at: standards.ieee.org/catalog/IEEE802.1/html.

* cited by examiner

*Primary Examiner*—Chau Nguyen
*Assistant Examiner*—Jung Park
(74) *Attorney, Agent, or Firm*—Blakely Sokoloff Taylor & Zafman

(57) ABSTRACT

A method for budgeted learning of link information in a network includes providing a database to contain the link information, for use by an entity connected to the network in transferring traffic over the network, and setting a maximum rate for addition of entries to the database. New entries to be added to the database are determined responsive to the traffic on the network during a learning period. The new entries are added to the database only if the addition of the entries during the learning period has not exceeded the maximum rate.

14 Claims, 2 Drawing Sheets

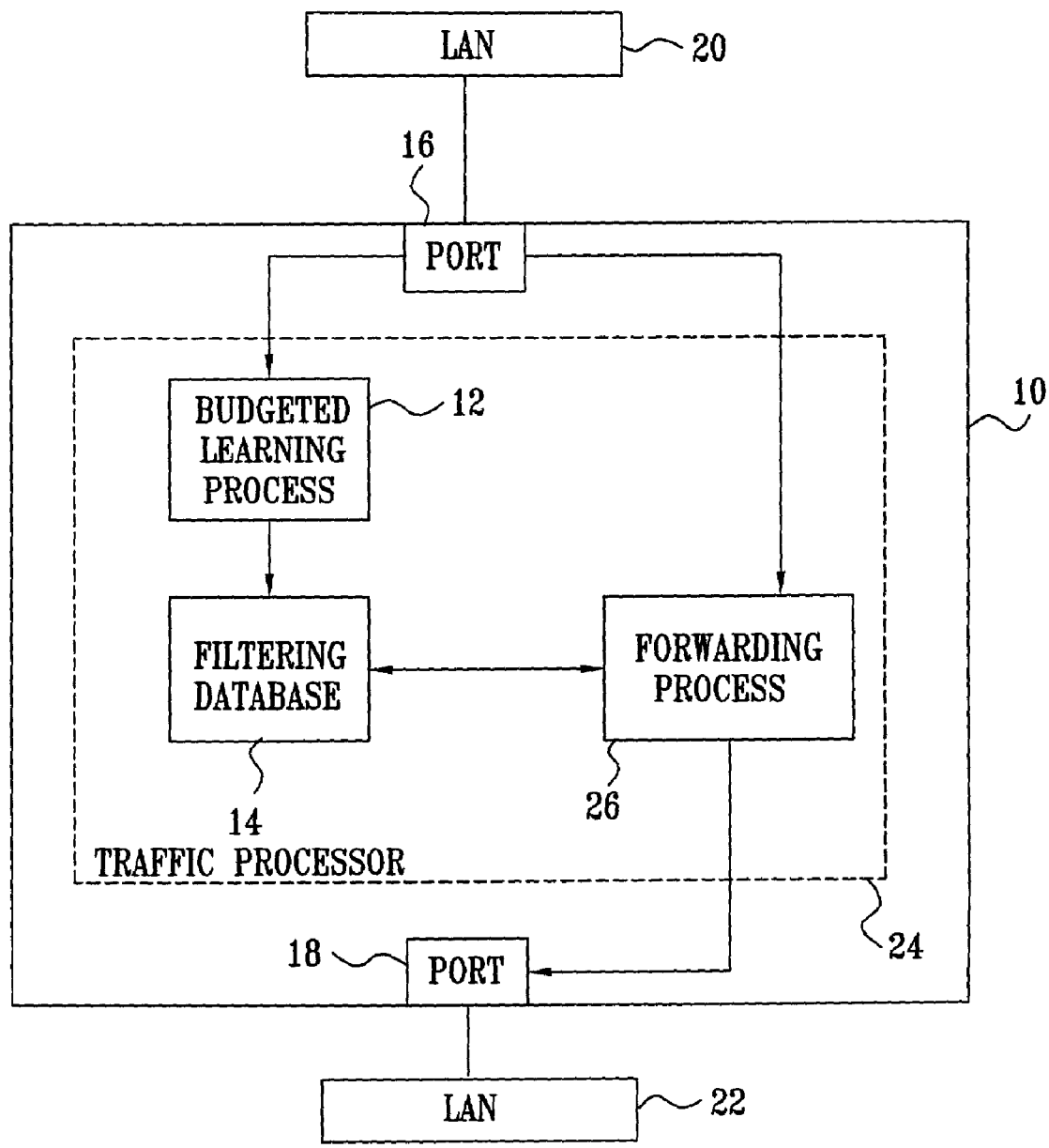

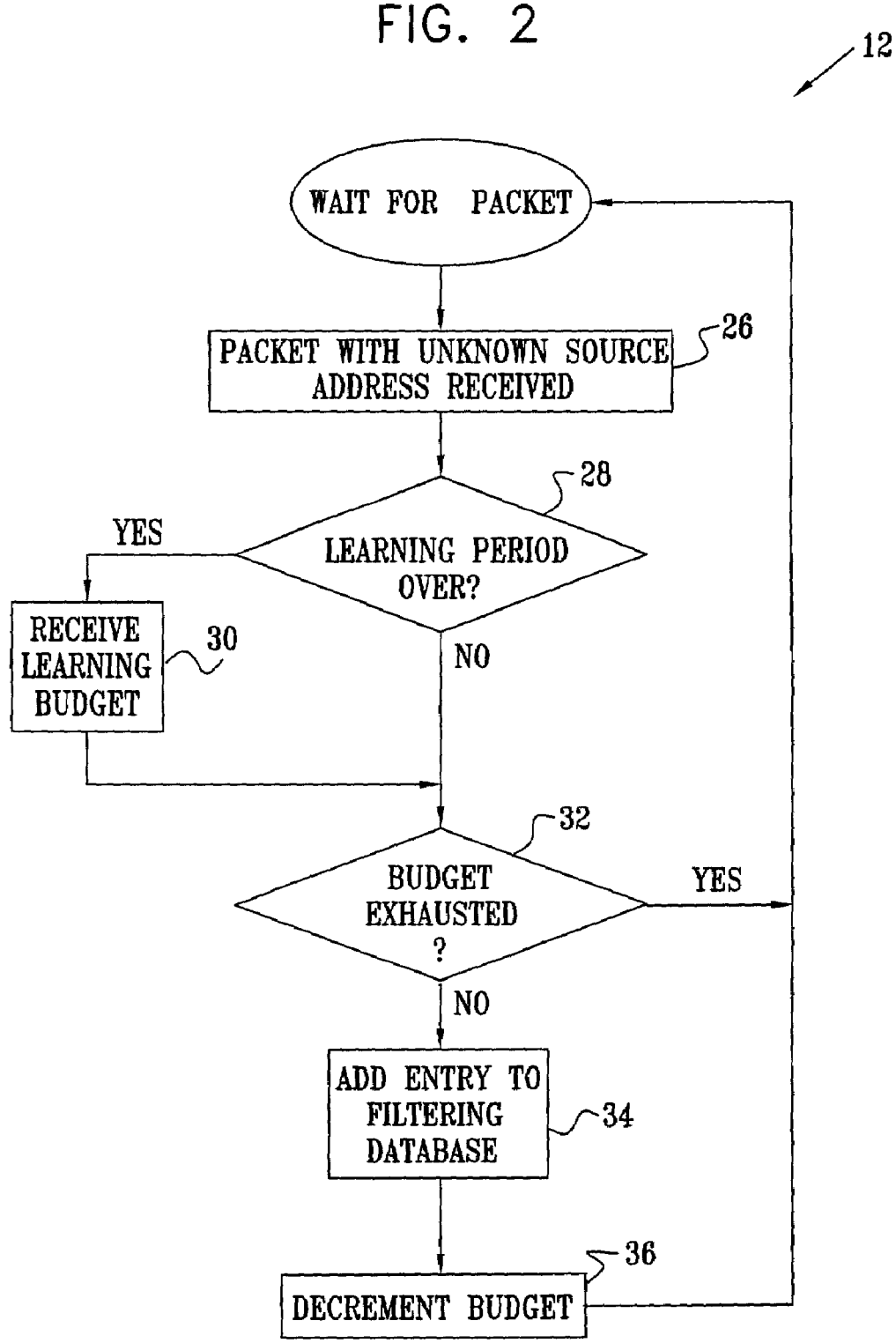

US 7,154,899 B2

PROTECTING THE FILTERING DATABASE IN VIRTUAL BRIDGES

FIELD OF THE INVENTION

The present invention relates generally to communication networks, and specifically to methods and apparatus for bridging between local area networks.

BACKGROUND OF THE INVENTION

Local Area Networks (LANs) connect computing systems together. LANs of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998), which is incorporated herein by reference. The 802.1D standard is available at standards.ieee.org/catalog/IEEE802.1.html.

Each computing system connects to a LAN through a MAC device. MAC bridges that implement the 802.1D standard allows MAC devices attached to separate LANs to appear to each other as if they were attached to a single LAN. A MAC bridge functions within the Logical Link Control (LLC) sublayer of the Network Layer defined in ISO/IEC standard 7498-1: 1994, entitled "Information Processing Systems—Open Systems Interconnection-Basic Reference Model—Part 1: The Basic Model" (available from the American National Standards Institute, New York, N.Y.), which is incorporated herein by reference. The bridge includes two or more MAC devices that interconnect the bridge ports to respective LANs.

The discussion that follows is an abstract of the processes and services provided in a MAC bridge, in accordance with sections of IEEE 802.1D standard.

Section 6.6 of the 802.1D standard sets forth a filtering service in a bridged LAN. The filtering service provides for administrative control over the use of ports by a single MAC address or a group of addresses, and reduces the load placed on MAC devices caused by the reception of frames that are destined for other devices. It limits frames destined for specific MAC addresses to parts of the network which, to a high probability, lie along a path between the source MAC address and the destination MAC address. It also reduces the distribution of group-addressed frames to those parts of the network which contain MAC devices that are legitimate recipients of that traffic, thus increasing the overall throughput of the network.

The filtering service maintains a filtering database to determine whether to relay a specific frame from one port to another. Section 7.9, at page 42 of the 802.1D standard, defines static and dynamic entries in the database. Each entry maps a destination MAC address to a port of the bridge. While static entries are fixed, dynamic entries in the filtering database are updated though a learning process, set out in section 7.8, page 42 of the 802.1D standard. The learning process observes the source addresses of frames received on each port, and dynamically updates the filtering database (conditionally on the state of the receiving port). It either creates or updates an entry in the filtering database, associating the port on which the frame was received with the frame's source MAC address. If the filtering database is filled to capacity when a new entry is to be created, an existing entry is removed to make room for the new one.

An aging mechanism is set forth in section 7.9.2 of the 802.1D standard. The aging mechanism is responsible for deletion of dynamic entries in the filtering database, freeing space to new entries instead of old entries that have low chance of use and ensuring that MAC addresses that have moved to a different LAN will not be permanently prevented from receiving frames. It also allows changes of topology of a network that includes many bridges and LANs.

If a frame is received on a given port of a bridge with a destination MAC address that does not appear in the filtering database, the forwarding process of the bridge (section 7.7 of the 802.1D standard) performs a broadcast of the received frame, known as "flooding" the frame, through the other ports. The broadcast may be limited to a particular broadcast domain, i.e., to a group of stations in the network that can communicate as if they were on the same LAN. (Virtual LANs (VLANs), as described below, facilitate easy administration of such groups.) Even so, the frame broadcast performed by the forwarding process causes two problems: traffic load on the network, and computational load on the MAC bridge. Therefore, efficient management of the filtering database and of the learning process used to build the database are important, in order to minimize flooding.

The "IEEE Standard for Local and Metropolitan Area Networks: Virtual Bridged Local Area Networks," published as IEEE Standard 802.1Q (1998), which is incorporated herein by reference, sets forth mechanisms for forming and managing VLANs. The 802.1Q standard is available at standards.ieee.org/catalog/IEEE802.1.html. Traffic between VLANs is restricted. Bridges in a VLAN environment forward unicast, multicast, and broadcast traffic only to ports that serve the VLAN to which the traffic belongs. MAC bridges in the VLAN environment must typically maintain their filtering databases as a shared resource among the different VLANs that they serve. The filtering database and the associated learning process must be modified accordingly. Entries in the database are identified both by their MAC address and their VLAN identifier. Optionally, information in the filtering database is shared among different VLANs using a Shared VLAN Learning (SVL) process defined in section 3.9 of the 802.1Q standard.

Multiprotocol Label Switching (MPLS) is gaining popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC is available at www.ietf.org/rfc.html.

In conventional connectionless packet routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. A short, fixed-length label identifying the FEC to which the packet belongs is pushed onto the top of a label stack, which is attached to the packet at the FEC ingress point. All packets in a given FEC are passed through the network over the same path by label-switching routers (LSRs). Unlike IP routers, LSRs simply use the packet label as an index to a look-up table, which specifies the next hop on the path for each FEC and the label that the LSR should attach to the packet for the next hop. The LSR pops the top label off the label stack, examines its destination address, and pushes another label onto the stack with the destination of the next hop.

The flow of packets along a label-switched path (LSP) under MPLS is completely specified by the label applied at the ingress of the path. A LSP is essentially a tunnel through the network, useful in network traffic management and communication security. MPLS tunnels are established by "binding" a particular label, assigned at the ingress node to the network, to a particular FEC.

Lasserre et al. describe a method to create a virtual LAN using a MPLS network in "Transparent VLAN services over MPLS" (July, 2001), which is incorporated herein by reference. This document is available at search.ietf.org/internet-drafts/draft-lasserre-tls-mpls-0 0.txt. A transparent LAN service (TLS) provides bridge-like functionality between multiple sites over a large network. Users connect to the TLS via regular node interfaces, and LSP(s) between the nodes to which the users are connected form the TLS entity itself. Every node in a TLS acts as a virtual bridge. A virtual bridge node has "virtual ports," which are the endpoints of LSPs that are part of the TLS. The interfaces to which the users are actually connected are "real" ports. Both virtual and real interfaces are treated identically from the point of view of bridge processing (frame forwarding policies and loops prevention). A single LSP can participate in multiple TLS instances, each belonging to a different user.

The TLS network topology is completely specified by the LSP connections, which in turn depend on the MPLS protocol to actually transfer the packets through the virtual tunnels. Since MPLS networks supply an alternative, virtual implementation of layer 2 network communications, TLS can be thought of as parallel to conventional virtual bridged local area networks, as specified in the IEEE 802.1Q standard. From the perspective of the end user, the TLS network is transparent, and the user is provided with the illusion that the LSPs are single-hop connections between adjacent bridges.

Filtering databases are implemented in LSRs in much the same way as in MAC bridges. Each TLS is essentially a VLAN or a group of VLANs. The filtering database holds information allowing the LSR to determine, given a destination MAC address of a packet, the real or virtual port through which to transmit the packet. In contrast to most MAC bridges, however, LSRs are often implemented in software. Therefore, when flooding is necessary, it can impose a particularly heavy computational load on the LSR.

The filtering database is limited in size and is therefore vulnerable to malicious "denial-of-service" (DOS) attacks that attempt to explode the filtering database with irrelevant entries. An attack carried out on a particular MAC bridge can effectively destroy the filtering database for a large segment of the network. For example, a hacker may send streams of dummy packets to a MAC bridge or LSR, containing a sequence of bogus source addresses. The learning process of the bridge is forced to fill the database with useless relay information for these addresses. Eventually, valid information will be discarded from the database to make room for the useless information. When the bridge receives legal packets, its forwarding process must flood the packets through all its ports, since the destination addresses have been flushed from the database. As a result, the network is loaded with unnecessary traffic and may cease to function entirely.

In a VLAN or TLS environment, the filtering database maintained by each bridge must typically be shared among the VLANs or TLSs served by the bridge. It is generally not possible to hard-code the logic controlling the database in order to partition it into different VLAN or TLS domains. Therefore, an attack on the database in one of the domains may lead to denial of service in other domains, as well.

SUMMARY OF THE INVENTION

It is an object of some aspects of the present invention to protect filtering databases used in virtual bridges, so as to prevent DOS attacks. The term "virtual bridge" as used herein refers both to MAC bridges used in VLAN environments and to bridges in other environments that mimic the behavior of MAC bridges, such as LSR nodes in a TLS environment.

In preferred embodiments of the present invention, the learning process carried out by a virtual bridge is limited to modifying only a portion of the shared filtering database in a period of time, referred to as the learning period. For any given communication domain, such as a VLAN or TLS domain, the rate of the learning process is limited, so that the process adds no more than a budgeted number of entries to the database within any given learning period. Frames received "over budget" from a VLAN or TLS domain with an unknown source MAC address are discarded. The budget level is preferably set so that under normal network traffic conditions, the rate of the learning process is substantially unaffected. Under exceptional conditions, however, such as a DOS attack, the budget inhibits the learning process in order to prevent breakdown on the bridge and interruption of normal network services.

There is therefore provided, in accordance with a preferred embodiment of the present invention, a method for budgeted learning of link information in a network, including:

providing a database to contain the link information, for use by an entity connected to the network in transferring traffic over the network;

setting a maximum rate for addition of entries to the database;

responsive to the traffic on the network during a learning period, determining a new entry to be added to the database; and adding the new entry to the database only if the addition of the entries during the learning period has not exceeded the maximum rate.

Preferably, setting the maximum rate includes setting a budget of the entries to be added to the database during the learning period, and adding the new entry includes adding the new entry to the database and decrementing the budget responsive to the new entry. Most preferably, setting the budget includes allocating a number of the entries to be added by the entity, such that a sum of the number of entries added over all the one or more entities during the learning period is less than or equal to a total number of the entries in the database.

Typically, the entity includes a bridge, and providing the database includes building a filtering database for use by the bridge. In some preferred embodiments, the bridge serves a plurality of communication domains, and setting the maximum rate includes setting a respective maximum number of the entries to be added responsive to the traffic in each of the domains, so that the new entry is added to the database responsive to the traffic in a given one of the domains only if the addition of the entries for the given one of the domains during the learning period by the bridge has not exceeded the respective maximum number. In one such preferred embodiment, the bridge includes a media access control (MAC) bridge, and the domains include Virtual Local Area Network (VLAN) domains. In another preferred embodiment, the bridge includes a label-switched router (LSR), and the domains include Transparent Local Area Network Service (TLS) domains. Typically, determining the new entry includes receiving a data packet having a source address that does not appear in the database, and generating the new entry responsive to the source address.

There is also provided, in accordance with a preferred embodiment of the present invention, a communication device, including:

one or more ports, adapted to send and receive traffic on a network; and a traffic processor, which is coupled to receive the traffic from the one or more ports, and to process the traffic for further transfer over the network using a database of link information, the traffic processor being further adapted, responsive to the traffic on the network during a learning period, to determine new entries to be added to the database and to add the new entries to the database only if addition of the new entries during the learning period has not exceeded a predetermined maximum rate for the addition of the new entries to the database.

The present invention will be more fully understood from the following detailed description of the preferred embodiments thereof, taken together with the drawings in which:

BRIEF DESCRIPTION OF THE DRAWINGS

FIG. 1 is a block diagram that schematically illustrates functional elements of a MAC bridge, in accordance with a preferred embodiment of the present invention; and FIG. 2 is a flow chart that schematically illustrates a method for limiting the ability of a learning process to modify a shared filtering database, in accordance with a preferred embodiment of the present invention.

DETAILED DESCRIPTION OF PREFERRED EMBODIMENTS

FIG. 1 is a block diagram that schematically illustrates elements of a MAC bridge 10, in accordance with a preferred embodiment of the present invention. Bridge 10 complies with the above-mentioned IEEE standards 802.1D and 802.1Q, but uses a budgeted learning process 12, as described hereinbelow, to inhibit DOS attacks on a filtering database 14. MAC bridge 10 has ports 16 and 18 connecting to LAN segments 20 and 22. The MAC bridge comprises a traffic processor 24, which monitors traffic on ports 16 and 18 and transfers frames destined for MAC addresses outside one of the LAN segments to the other LAN segment by means of a forwarding process 26. Thus, frames received by port 16 with destination MAC addresses outside LAN segment 20 are relayed to LAN segment 22 through port 18 by forwarding process 26, and vice versa. Information enabling proper functioning of the forwarding process is stored in filtering database 14, which is typically shared among a number of different VLAN domains. Forwarding process 26 comprises a broadcast mechanism whereby frames with destination MAC addresses unknown in filtering database 14 are broadcast over LAN segments within a broadcast domain as described in the Background of the Invention.

Learning process 12 monitors the source addresses of packets received on ports 16 and 18, in order to add entries as appropriate to database 14. A learning budget is assigned to each VLAN domain served by bridge 10. As long as the budget of the respective VLAN domain has not been exhausted, the learning process adds suitable entries to the filtering database based on the packet source addresses. In this way, subsequent frames with identical destination MAC addresses will be forwarded in a more efficient manner. Although FIG. 1 and the methods described below relate explicitly to MAC bridge 10 and VLAN domains associated therewith, these methods may equally be applied, mutatis mutandis, to a LSR serving multiple TLS domains, or to virtual bridges of other types.

FIG. 2 is a flow chart that schematically illustrates a method for controlling the ability of budgeted learning process 12 to modify filtering database 14, in accordance with a preferred embodiment of the present invention. Budgeted learning process 12 is divided temporally into learning periods, which are preferably several minutes in duration. At the beginning of each learning period, the learning process receives a new budget of database entries for each VLAN domain served by bridge 10. Typically, the number of entries in the budget is fixed in advance and is modified only occasionally. The learning budget size is preferably configured such that the sum of the possible entries learned by all the domains within each learning period is less than or equal to the maximum size of the shared filtering database. Most preferably, the sum is less than the maximum size to allow room for new domains.

The method of FIG. 2 is initiated when bridge 10 receives a packet with an unknown source address, at a packet reception step 26. The source address is unknown in the sense that there is no entry in filtering database 14 corresponding to that address. At a learning period termination test step 28, learning process 12 tests for the end of the learning period. If the learning period has ended, the learning process receives a new budget of database entries for each VLAN domain, at a budgeting step 30. During the learning period, each time the learning process receives a packet in a given domain with an unknown source address, it tests whether it has exhausted its budget of entries for the domain, at a budget exhaustion test step 32.

If the budget is not exhausted, learning process 12 adds a new entry into database 14, at an add entry step 34. The learning process decrements the budget of entries it may enter into the database for this VLAN domain during the learning period, at a budget decrement step 36 and returns to wait for the next packet. If the budget of entries is exhausted at budget exhaustion test step 32, the learning process terminates for this domain until the current learning period is over, without adding the entry to the filtering database.

Although preferred embodiments described herein are based on specific procedures and terminology defined by the 802.1 standard, cited above, the principles of the present invention are applicable, as well, to networks and standards of other types in which an automated learning process is used to build and maintain a database used in forwarding packets. It will thus be appreciated that the preferred embodiment described above is cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for budgeted learning of link information in a network, comprising:

providing a database to contain the link information, for use by an entity connected to the network in transferring traffic over the network;

setting a maximum rate for addition of entries to the database;

responsive to the traffic on the network during a learning period, determining a new entry to be added to the database; and adding the new entry to the database only if the addition of the entries during the learning period has not exceeded the maximum rate, wherein setting the maximum rate comprises setting a budget of the entries to be added to the database during the learning period, and wherein adding the new entry comprises adding the new entry to the database and decrementing the budget responsive to the new entry.

2. A method according to claim 1, wherein setting the budget comprises allocating a number of the entries to be added by the entity, such that a sum of the number of entries added over all the one or more entities during the learning period is less than or equal to a total number of the entries in the database.

3. A method according to claim 1, wherein the entity comprises a bridge, and wherein providing the database comprises building a filtering database for use by the bridge.

4. A method according to claim 3, wherein the bridge serves a plurality of communication domains, and wherein setting the maximum rate comprises setting a respective maximum number of the entries to be added responsive to the traffic in each of the domains, so that the new entry is added to the database responsive to the traffic in a given one of the domains only if the addition of the entries for the given one of the domains during the learning period by the bridge has not exceeded the respective maximum number.

5. A method according to claim 4, wherein the bridge comprises a media access control (MAC) bridge, and wherein the domains comprise Virtual Local Area Network (VLAN) domains.

6. A method according to claim 3, wherein determining the new entry comprises receiving a data packet having a source address that does not appear in the database, and generating the new entry responsive to the source address.

7. A method for budgeted learning of link information in a network, comprising:

providing a database to contain the link information, for use by an entity connected to the network in transferring traffic over the network;

setting a maximum rate for addition of entries to the database;

responsive to the traffic on the network during a learning period, determining a new entry to be added to the database; and adding the new entry to the database only if the addition of the entries during the learning period has not exceeded the maximum rate, wherein the entity comprises a bridge, and wherein providing the database comprises building a filtering database for use by the bridge, and wherein the bridge serves a plurality of communication domains, and wherein setting the maximum rate comprises setting a respective maximum number of the entries to be added responsive to the traffic in each of the domains, so that the new entry is added to the database responsive to the traffic in a given one of the domains only if the addition of the entries for the given one of the domains during the learning period by the bridge has not exceeded the respective maximum number, and wherein the bridge comprises a label-switched router (LSR), and wherein the domains comprise Transparent Local Area Network Service (TLS) domains.

8. A communication device, comprising:

one or more ports, adapted to send and receive traffic on a network; and a traffic processor, which is coupled to receive the traffic from the one or more ports, and to process the traffic for further transfer over the network using a database of link information, the traffic processor being further adapted, responsive to the traffic on the network during a learning period, to determine new entries to be added to the database and to add the new entries to the database only if addition of the new entries during the learning period has not exceeded a predetermined maximum rate for the addition of the new entries to the database, wherein the maximum rate is determined by setting a budget specifying a number of the entries to be added to the database during the learning period, and wherein the processor is adapted to decrement the budget responsive to each of the new entries that it adds to the database during the learning period.

9. A device according to claim 8, wherein the budget is set so that a sum of the number of the entries added to the database during the learning period is less than or equal to a total number of the entries in the database.

10. A device according to claim 8, wherein the ports and the traffic processor are configured so that the device operates as a bridge, and wherein the database comprises a filtering database used in the bridge.

11. A device according to claim 10, wherein the bridge serves a plurality of communication domains, and wherein the maximum rate is determined by setting a respective maximum number of the entries to be added responsive to the traffic in each of the domains, so that the new entries are added to the database responsive to the traffic in a given one of the domains only if the addition of the entries for the given one of the domains during the learning period has not exceeded the respective maximum number.

12. A device according to claim 11, wherein the bridge comprises a media access control (MAC) bridge, and wherein the domains comprise Virtual Local Area Network (VLAN) domains.

13. A device according to claim 10, wherein the traffic processor is adapted to generate the new entries responsive to receiving a data packet having a source address that does not appear in the database.

14. A communication device, comprising:

one or more ports, adapted to send and receive traffic on a network; and a traffic processor, which is coupled to receive the traffic from the one or more ports, and to process the traffic for further transfer over the network using a database of link information, the traffic processor being further adapted, responsive to the traffic on the network during a learning period, to determine new entries to be added to the database and to add the new entries to the database only if addition of the new entries during the learning period has not exceeded a predetermined maximum rate for the addition of the new entries to the database, wherein the ports and the traffic processor are configured so that the device operates as a bridge, and wherein the database comprises a filtering database used in the bridge, and wherein the bridge serves a plurality of communication domains, and wherein the maximum rate is determined by setting a respective maximum number of the entries to be added responsive to the traffic in each of the domains, so that the new entries are added to the database responsive to the traffic in a given one of the domains only if the addition of the entries for the given one of the domains during the learning period has not exceeded the respective maximum number, and wherein the bridge comprises a label-switched router (LSR), and wherein the domains comprise Transparent Local Area Network Service (TLS) domains.

* * * * *